United States Patent [19]
Numoto et al.

[11] Patent Number: 6,044,649
[45] Date of Patent: Apr. 4, 2000

[54] AIR CONDITIONER

[75] Inventors: Hironao Numoto, Shiga; Yukio Watanabe, Kyoto, both of Japan

[73] Assignee: Matsushita Electric Industrial Co., Ltd., Osaka, Japan

[21] Appl. No.: 09/218,466

[22] Filed: Dec. 22, 1998

[30]  Foreign Application Priority Data

Dec. 22, 1997 [JP] Japan .................................. 9-352627

[51] Int. Cl.⁷ ...................................................... F25B 41/00
[52] U.S. Cl. ................................ 62/114; 62/512; 62/112; 62/474; 62/509
[58] Field of Search .............................. 62/474, 512, 112, 62/509, 114

[56] References Cited

U.S. PATENT DOCUMENTS

| | | | |
|---|---|---|---|
| 5,201,195 | 4/1993 | Gavlak et al. | 62/474 |
| 5,289,697 | 3/1994 | Hutchison | 62/474 |
| 5,364,540 | 11/1994 | Sciuto | 62/474 |
| 5,398,523 | 3/1995 | Yoshii et al. | 62/474 |
| 5,490,397 | 2/1996 | Kitamura et al. | 62/474 |
| 5,557,945 | 9/1996 | Mangyo et al. | 62/474 |
| 5,580,451 | 12/1996 | Tack | 62/474 |
| 5,910,165 | 6/1999 | Haramoto et al. | 62/474 |
| 5,911,879 | 6/1999 | Eybergen | 62/474 |

FOREIGN PATENT DOCUMENTS 8-219593  8/1996  Japan .

*Primary Examiner*—Henry Bennett
*Assistant Examiner*—Mark Shulman
*Attorney, Agent, or Firm*—Ratner & Prestia

[57] ABSTRACT

An air conditioner comprises a refrigeration cycle consisting of a compressor, a heat exchanger, a throttling device, a dryer provided with an adsorbent, a connection piping and a refrigerant. The refrigerant contains a hydrofluorocarbon refrigerant, the adsorbent contains a plurality of bulk particles, and the dryer includes a container, wherein the adsorbent is located within the container, having a pressing means for holding the adsorbent by pressing it. The load of the pressing means is within a range of about 0.5 kg/cm² to about 3 kg/cm². The container is of a cylindrical shape having a sectional area of "A", the refrigerant is at a circulation rate of "B", and the value of B/A is within a range of about 100 g/min cm² to about 400 g/min cm². The pressing means has a punching baffle formed with a plurality of through-holes, each one of the plurality of bulk particles has a mean diameter of "D", each one of the plurality of through-holes has a diameter of "C", and the value of D/C is at least about 2. The dryer removes water in the refrigeration cycle by allowing the adsorbent to adsorb water contained in the refrigerant.

15 Claims, 1 Drawing Sheet

AIR CONDITIONER

FIELD OF THE INVENTION

The present invention relates to an air conditioner having a refrigeration cycle containing hydrofluorocarbon as refrigerant, more particularly, to a dryer composing such air conditioner.

BACKGROUND OF THE INVENTION

In a refrigeration cycle of air conditioner, a refrigerant is circulated in the cycle while changing in three states, that is, liquid phase, gas-liquid twin phase and gas phase. A dryer for refrigeration cycle filled with such adsorbent as zeolite for adsorbing moisture has been used in an air conditioner. However, in its method of use, it has been preferably placed in such location that the refrigerant is at a low temperature, and the power loss is smaller as the refrigerant is closer to liquid phase, which has been a desirable condition of use. Even in the case of changing over between cooling and heating operations, it has been often operated with the refrigerant flowing in one direction.

In a refrigeration cycle of air conditioner, however, because of the desirability for designing with reduced size, it is desirable for components to have a resistant property to severe conditions. In addition, as the refrigerant used has been changed from hydrochlorofluorocarbon (HCFC) to a substitute refrigerant, hydrofluorocarbon (HFC), the pressure of the refrigerant has been increased about 1.6 times, and it has been desirable to sufficiently consider a resistance to vibration associated with such increase in pressure of the refrigerant.

SUMMARY OF THE INVENTION

An air conditioner preventing deterioration of an adsorbent according to an exemplary embodiment of the present invention comprises a refrigeration cycle including a compressor, an indoor heat exchanger, an outdoor heat exchanger, a throttling device, a dryer provided with an adsorbent, connection piping and a refrigerant. The refrigerant includes a hydrofluorocarbon refrigerant, the adsorbent includes a plurality of bulk particles, the dryer includes a container, an adsorbent provided in the container and a pressing means for holding the adsorbent by pressing it, wherein the load of the pressing means is within a range of about 0.5 kg/cm$^2$ to about 3 kg/cm$^2$, and the dryer removes water in the refrigeration cycle by allowing the adsorbent to adsorb water contained in the refrigerant.

In another exemplary embodiment of the invention, an air conditioner preventing deterioration of an adsorbent comprises a refrigeration cycle including of a compressor, an indoor heat exchanger, an outdoor heat exchanger, a throttling device, a dryer provided with an adsorbent, a connection piping and a refrigerant. The refrigerant includes a hydrofluorocarbon refrigerant, the adsorbent includes a plurality of bulk particles, the dryer includes a container having an adsorbent provided in the container and pressing means for holding the adsorbent by pressing it, the container is of a cylindrical shape having a sectional area of "A", the refrigerant is at a circulation rate of "B", the value of B/A is within a range of about 100 g/min cm$^2$ to about 400 g/min cm$^2$, and the dryer removes water in the refrigeration cycle by allowing the adsorbent to adsorb water contained in the refrigerant.

Another air conditioner preventing deterioration of an adsorbent according to an exemplary embodiment of the present invention comprises a refrigeration cycle including a compressor, an indoor heat exchanger, an outdoor heat exchanger, a throttling device, a dryer provided with an adsorbent, a connection piping and a refrigerant. The refrigerant includes a hydrofluorocarbon refrigerant, the adsorbent includes a plurality of bulk particles, the dryer includes a container, an adsorbent provided in the container and pressing means for holding the adsorbent by pressing it, the pressing means has a punching baffle formed with a plurality of through-holes, each one of the plurality of bulk particles has a mean diameter of "D", each one of the plurality of through-holes has a diameter of "C", the value of D/C is at 2 or more, and the dryer removes water in the refrigeration cycle by allowing the adsorbent to adsorb water contained in the refrigerant.

Specifically, it is desirable that the hydrofluorocarbon refrigerant includes at least one of difluoromethane and pentafluoroethane.

It is desirable that the pressing means has a spring.

According to aforesaid constitution, the adsorbent contained in the dryer provides a long-term reliability.

DESCRIPTION OF REFERENCE NUMERALS

Figure 1:
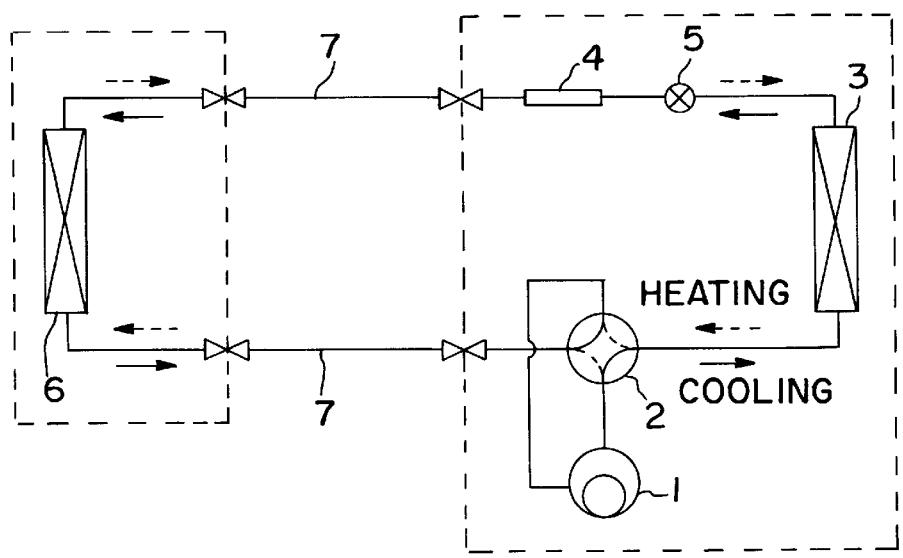
FIG. 1 is a cycle layout of an air conditioner according to an exemplary embodiment of the invention.

1 Compressor
2 Four-way valve
3 Outdoor heat exchanger
4 Dryer
5 Throttling device
6 Indoor heat exchanger
7 Outdoor connection piping
8 Pressure resistant container
9 Screen holder
10 Screen
11 Spring
12 Punching baffle
13 Adsorbent
14 Dowel

DETAILED DESCRIPTION OF THE INVENTION

An air conditioner according to an exemplary embodiment of the present invention comprises a refrigeration cycle consisting of a compressor, a four-way valve, an outdoor heat exchanger, a throttling device, an indoor heat exchanger and at least one refrigerant of difluoromethane (HFC32) and pentafluoroethane (HFC125). A refrigerant mixture consisting of HFC32 and HFC125 is HFC410A. The dryer is provided with a spherical adsorbent in a pressure resistant container for adsorbing water in the refrigeration cycle, and the adsorbent is fixed and held by a spring. The spring load of the spring placed in the pressure resistant container is within a range of about 0.53 kg/cm$^2$ to about 3 kg/cm$^2$. The spring load represents a load on a unit area of the adsorbent placed when the spring is compressed from its natural length to a predetermined length. By optimizing the spring load, the adsorbent is securely held without breakage even if it is subjected to an excessive flow rate and vibration of the HFC410A refrigerant.

According to an other aspect of the present invention, a dryer is provided for an air conditioner, in which the spring constant of a spring is at about 0.3 kg/cm² to about 1 kg/cm². The spring constant is expressed as:

$$\frac{\text{(Load on adsorbent)}}{\text{(Natural length of spring)}} - \text{(Length of spring reduced by compression)}$$

and an adsorbent can be securely held by the spring in spite of excessive flow rate or vibration of the HFC410A refrigerant, by optimizing the spring constant, while providing the spring with a sufficient allowance.

According to another aspect of the present invention, a dryer is provided for an air conditioner, in which the relation between a sectional area of "A" of a channel inside a pressure resistant container and a circulation rate of "B" of a refrigerant is expressed by 100 g/min cm² ≦ B/A ≦ 400 g/min cm². A circulation rate of refrigerant means a circulation rate of refrigerant at a specified operating frequency. By specifying a sectional area of channel in relation to a circulation rate of refrigerant, water in the cycle can be adsorbed efficiently, and no significant pressure loss can be caused.

According to still another aspect of the present invention, a dryer is provided for an air conditioner, in which an adsorbent is securely held by a spring with a punching baffle between them, and the ratio of a perforation size of "C" in the punching baffle to a diameter of "D" of the spherical adsorbent is at D/C ≧ 2. By optimally specifying the ratio between the perforation size of "C" in the punching baffle and the diameter of "D" of the spherical adsorbent, a long-term reliability of dryer can be provided without causing penetration of the adsorbent into the perforation.

According to a further aspect of the present invention, as a factor requiring a careful consideration for assuring a long-term reliability of an adsorbent in the refrigeration cycle, in the case the HFC410A refrigerant mixture consisting of difluoromethane (HFC32) and pentafluoroethane (HFC125) as refrigerants is employed, it is desirable to provide such property that the zeolite structure can be stably retained, because HFC32 having a lower molecular weight is removed from the adsorbent. As means for controlling the property required by a simple measurement of physical property, determination from an isothermal adsorption curve at a low pressure is used. In such manner, a long-term assurance can be provided.

Now, exemplary embodiments of an air conditioner according to the invention are described in detail below by referring to the drawings.

Exemplary Embodiment 1

FIG. 1 shows a refrigeration cycle according to an exemplary embodiment of the invention. In FIG. 1, an air conditioner comprises a compressor 1, a four-way valve 2, an outdoor heat exchanger 3, a dryer 4, a throttling device 5, an indoor heat exchanger 6 and an indoor-outdoor connection piping 7. The compressor 1, four-way valve 2, outdoor heat exchanger 3, dryer 4 and throttling device 5 are incorporated in an outdoor unit. An indoor unit incorporates the indoor heat exchanger 6 composing the system.

Figure 2:
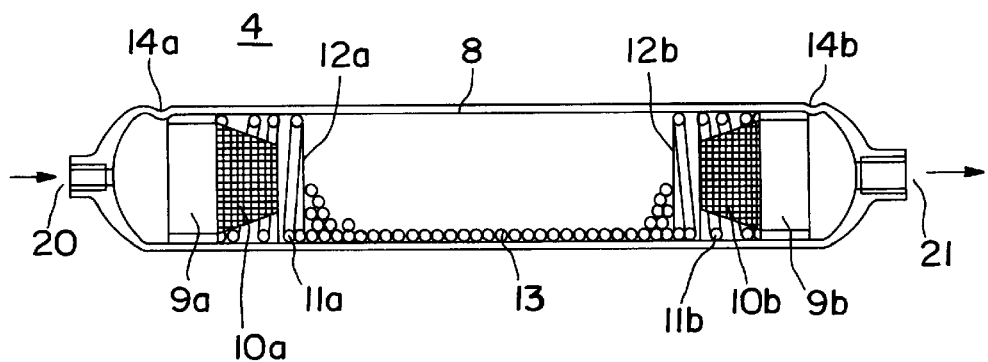
FIG. 2 is a partial sectional view of a dryer used in an air conditioner according to an exemplary embodiment of the invention.

A structure of the dryer 4 used in the exemplary embodiment is shown in FIG. 2. In FIG. 2, the dryer 4 comprises a pressure resistant container 8, an adsorbent 13, a first punching baffle 12a, a second punching baffle 12b, a first spring 11a and a second spring 11b as pressing means, a first screen 10a, a second screen 10b, a first screen holder 9a and a second screen holder 9b. The pressure resistant container 8 has an inlet opening 20 and an outlet opening 21. The adsorbent 13 is placed generally in a central part within the pressure resistant container. The first and second punching baffles 12a and 12b formed with a plurality of perforations are provided in either side of the adsorbent. The first spring 11a and second spring 11b are positioned such that the first punching baffle 12a and second punching baffle 12b are pressed by the springs, respectively. Thus, the adsorbent 13 is fixed and held within the pressure resistant container 8 by the first and second springs 11a and 11b. The first and second springs 11a and 11b are held, respectively, by first dowel 14a and second dowel 14b formed in the pressure resistant container. The first screen 10a and second screen 10b are formed in a nearly conical shape with through-holes provided in a mesh pattern, and are located inside the first and second springs 11a and 11b, respectively. Thus, the first and second screens 10a and is 10b are of such nearly conical shape that a sectional area located toward the center of pressure resistant container 8 is smaller than a sectional area located in an outer side. Further, the first and second springs 11a and 11b are formed in such shape that the first and second screens 10a and 10b of the nearly conical shape can be placed inside thereof, respectively. The first and second screens 10a and 10b are fixed, respectively, by the first and second screen holders 9a and 9b provided in either side thereof. In such manner, the adsorbent 13 is placed in the pressure resistant container 8 in such state that it is pressed by the first and second springs 11a and 11b located in either side thereof. In FIG. 2, the adsorbent 13 is provided in an entire space between the first and second punching baffles 12a and 12b. In FIG. 2, the refrigerant enters inside the pressure resistant container 8 through the inlet opening 20 of the dryer 4, comes in contact with the adsorbent 13, and is discharged through the outlet opening 21. Then, water contained in the refrigerant is adsorbed by the adsorbent 13, and removed from the refrigerant.

Figure 3:
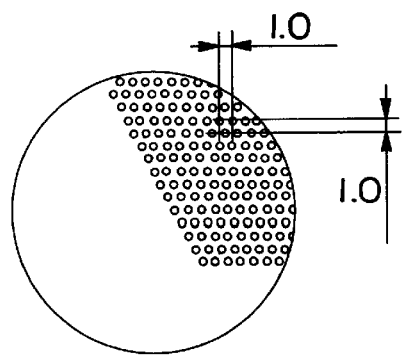
FIG. 3 is a punching baffle in a dryer used in an air conditioner according to an exemplary embodiment of the invention.

As a refrigerant, HFC410A containing difluoromethane (HFC32) and pentafluoroethane (HFC125) is employed. As a lubricant, an ester oil for use with HFC410A refrigerant for a cooling capacity of 4.0 kW class is used. The pressure resistant container 8 has an inner diameter of 2.5 cm and a sectional area of channel of 4.91 cm². For the adsorbent 13, an adsorbent of 28 g having a diameter of 1.7 to 2.4 mm (ZEOLITE prepared by Union Showa; XH-10C) is employed. The punching baffle 12 has perforations of 0.8 mm in diameter formed at the void ratio of 50%. The punching baffle 12 is made of a brass of 0.5 mm thick, and a front view thereof is shown in FIG. 3. The spring 11 has a spring load of 3 kg/cm², a spring constant of 1.0 kg/cm and a wire diameter of 1.8 mm, and is made of SUS304. The adsorbent contains a plurality of bulk particles. It is preferable that each one of the plurality of bulk particles of the adsorbent is generally of a spherical shape having a diameter within a range of about 0.5 mm to about 5 mm, it is especially preferable the range of about 2 mm to 4 mm. If the diameter of the adsorbent is lower than about 0.5 mm, the loss of the stream pressure of the refrigerant increases, or the stream of the refrigerant is prevented. If the diameter is higher than about 5 mm, the mechanical strength of the adsorbent decreases, and the mechanical strength of the baffle.

An air conditioner incorporating such dryer 4 was operated by intentionally applying one gram of water within a refrigeration cycle. As a result, in the case of heating operation, the water in the refrigeration cycle was adsorbed by the dryer in about 4 hours. Similarly, in the case of cooling operation, the water in the refrigeration cycle was adsorbed by the dryer in about 14 hours.

A reliability test was conducted by changing over between cooling and heating operations every 5 minutes, respectively, and operating the system for 5000 hours almost at a specified frequency. As a result, the adsorbent in the dryer did not deteriorate to a powder form, and maintained its original diameter in size.

Exemplary Embodiment 2

An air conditioner shown in FIG. 1 and FIG. 2 is used with HFC410A as a refrigerant. As a lubricant, an ester oil for use with HFC410A refrigerant for a cooling capacity of 3.2 kW class is employed. The pressure resistant container 8 has an inner diameter of 2.5 cm and a sectional area of channel of 4.91 cm$^2$. For the adsorbent 13, zeolite of 28 g having a diameter of 1.7 to 2.4 mm is used. The adsorbent 13 is fixed by springs having a spring load of 2 kg/cm$^2$ and a spring constant of 0.6 kg/cm$^2$ with punching baffles formed with perforations of 0.8 mm in diameter at the void ratio of 50%.

Such air conditioner was operated by in tentionally apply ing one gram of water within a refrigeration cycle. As a result, in the case of heating operation, the water in the refrigeration cycle was adsorbed by the dryer in about 4.5 hours. Similarly, in the case of cooling operation, the water in the refrigeration cycle was adsorbed by the dryer in about 15 hours.

A reliability test was conducted by changing over between cooling and heating operations every 5 minutes, respectively, and operating the system for 5000 hours almost at a specified frequency. As a result, the adsorbent in the dryer did not deteriorate to a powder form, and maintained its original shape and size.

Exemplary Embodiment 3

An air conditioner shown in FIG. 1 and FIG. 2 is employed. In the embodiment, an HFC410A refrigerant for a cooling capacity of 2.5 kW class and an ester oil are employed. An adsorbent of 28 g having a diameter of 1.7 to 2.4 mm is placed in a pressure resistant container of an inner diameter of 2.5 cm (a sectional area of channel of 4.91 cm$^2$), and the adsorbent 13 is fixed by springs having a spring load of 1 kg/cm$^2$ and a spring constant of 0.4 kg/cm with punching baffles formed with perforations of 0.8 mm in diameter at 50% of void ratio between them.

The system was operated by intentionally applying one gram of water within a refrigeration cycle. As a result, in the case of heating operation, the water in the refrigeration cycle was adsorbed by the dryer in about 5 hours. Similarly, in the case of cooling operation, the water in the refrigeration cycle was adsorbed by the dryer in about 16 hours.

A reliability test was conducted by changing over between cooling and heating operations every 5 minutes, and operating the system for 5000 hours almost at a specified frequency. As a result, the adsorbent in the dryer did not deteriorate to a powder form, and maintained its original shape.

Exemplary Embodiment 4

An air conditioner shown in FIG. 1 and FIG. 2 is employed. In the embodiment, an HFC410A refrigerant for a cooling capacity of 4.0 kW class and an ester oil are employed. An adsorbent of 28 g having a diameter of 1.7 to 2.4 mm is placed in a pressure resistant container of an inner diameter of 2.5 cm (a sectional area of channel of 4.91 cm$^2$), and the adsorbent 13 is fixed by springs having a spring load of 0.5 kg/cm$^2$ and a spring constant of 0.3 kg/cm with punching baffles formed with perforations of 0.8 mm in diameter at 50% of void ratio between them.

The system was operated by intentionally applying one gram of water within a refrigeration cycle. As a result, in the case of heating operation, the water in the refrigeration cycle was adsorbed by the dryer in about 4 hours. Similarly, in the case of cooling operation, the water in the refrigeration cycle was adsorbed by the dryer in about 14 hours.

A reliability test was conducted by changing over between cooling and heating operations every 5 minutes, and operating the system for 5000 hours at a specified frequency. As a result, the adsorbent in the dryer hardly deteriorated to a powder form, and maintained its original shape. However, it was confirmed that the adsorbent particles were dislocated within the dryer at initiation of the cooling operation. Thus, the system was operated again for 10000 hours. As a result, the adsorbent in the dryer was slightly changed in shape to powder. The powdering ratio of the adsorbent was about 0.02 wt %. In other words, the ratio of the adsorbent changed to powder was about 0.02 wt %.

Exemplary Embodiment 5

In an air conditioner according to the invention, an HFC410A refrigerant for a cooling capacity of 4.0 kW class and an ester oil are employed. An adsorbent of 28 g having a diameter of 1.7 to 2.4 mm is placed in a pressure resistant container of an inner diameter of 2.5 cm (a sectional area of channel of 4.91 cm$^2$), and the adsorbent 13 is fixed by springs having a spring load of 0.5 kg/cm$^2$ and a spring constant of 1 kg/cm with punching baffles formed with perforations of 0.8 mm in diameter at 50% of void ratio between them.

The system was operated by intentionally applying one gram of water within a refrigeration cycle. As a result, in the case of heating operation, the water in the refrigeration cycle was adsorbed by the dryer in about 4 hours. Similarly, in the case of cooling operation, the water in the refrigeration cycle was adsorbed by the dryer in about 14 hours.

A reliability test was conducted by changing over between cooling and heating operations every 5 minutes, and operating the system for 5000 hours at a specified frequency. As a result, the adsorbent in the dryer hardly deteriorated to a powder form. However, it was confirmed that the adsorbent particles were dislocated within the dryer at initiation of the cooling operation. Thus, the system was operated again for 10000 hours. As a result, the adsorbent in the dryer was slightly changed in shape to powder. The powdering ratio of the adsorbent was about 0.05 wt %.

Comparative Example 1

As a comparative example, in an air conditioner shown in FIG. 1 and FIG. 2, springs having a smaller spring load are employed. In the comparative example, an HFC410A refrigerant for a cooling capacity of 4.0 kW class and an ester oil are used. An adsorbent of 28 g having a diameter of 1.7 to 2.4 mm is placed in a pressure resistant container of an inner diameter of 2.5 cm (a sectional area of channel of 4.91 cm$^2$), and the adsorbent 13 is fixed by the springs having a spring load of 0.4 kg/cm$^2$ and a spring constant of 1 kg/cm with punching baffles formed with perforations of 0.8 mm in diameter at 50% of void ratio between them.

The system was operated by intentionally applying one gram of water within a refrigeration cycle. As a result, in the case of heating operation, the water in the refrigeration cycle was mostly adsorbed by the dryer in about 4 hours. Similarly, in the case of cooling operation, the water in the refrigeration cycle was mostly adsorbed by the dryer in about 14 hours.

A reliability test was conducted by changing over between cooling and heating operations every 5 minutes, and operating the system for 5000 hours generally at a specified frequency. As a result, the adsorbent in the dryer was changed to a powder form. The ratio of the adsorbent changed to powder was 0.2 wt %.

Comparative Example 2

As a comparative example, in an air conditioner shown in FIG. 1 and FIG. 2, springs having a significantly high spring load are employed. In the comparative example, an HFC410A refrigerant for a cooling capacity of 4.0 kW class and an ester oil are used. An adsorbent of 28 g having a diameter of 1.7 to 2.4 mm is placed in a pressure resistant container of an inner diameter of 2.5 cm (a sectional area of channel of 4.91 cm$^2$), and the adsorbent is fixed by the springs having a spring load of 4 kg/cm$^2$ and a spring constant of 1 kg/cm with punching baffles formed with perforations of 0.8 mm in diameter at 50% of void ratio between them.

As a result of operating the system by intentionally applying one gram of water within a refrigeration cycle, in the case of heating operation, the water in the refrigeration cycle was mostly adsorbed by the dryer in about 4 hours. Similarly, in the case of cooling operation, the water in the refrigeration cycle was mostly adsorbed by the dryer in about 14 hours.

A reliability test was conducted by changing over between cooling and heating operations every 5 minutes, and operating the system for 5000 hours at a specified frequency. As a result, a part of the adsorbent in the dryer was changed to a powder form due to abrasion. The ratio of the adsorbent changed to powder was 1.0 wt %.

Comparative Example 3

As a comparative example, in an air conditioner shown in FIG. 1 and FIG. 2, springs having a low spring load are employed. In the comparative example, an HFC410A refrigerant for a cooling capacity of 4.0 kW class and an ester oil are used. An adsorbent of 28 g having a diameter of 1.7 to 2.4 mm is placed in a pressure resistant container of an inner diameter of 2.5 cm (a sectional area of channel of 4.91 cm$^2$), and the adsorbent is fixed by the springs having a spring load of 0.5 kg/cm$^2$ and a spring constant of 0.2 kg/cm with punching baffles formed with perforations of 0.8 mm in diameter at 50% of void ratio between them.

As a result of operating the system by intentionally applying one gram of water within a refrigeration cycle, in the case of heating operation, the water in the refrigeration cycle was mostly adsorbed by the dryer in about 4 hours. Similarly, in the case of cooling operation, the water in the refrigeration cycle was mostly adsorbed by the dryer in about 14 hours.

A reliability test was conducted by changing over between cooling and heating operations every 5 minutes, and operating the system for 5000 hours at a specified frequency. As a result, the adsorbent in the dryer was changed to a powder form. The powdering ratio of the adsorbent was 0.2 wt %.

Comparative Example 4

As a comparative example, in an air conditioner shown in FIG. 1 and FIG. 2, springs having a significantly high spring constant are employed. In the comparative example, an HFC410A refrigerant for a cooling capacity of 4.0 kW class and an ester oil are used. An adsorbent of 28 g having a diameter of 1.7 to 2.4 mm is placed in a pressure resistant container of an inner diameter of 2.5 cm (a sectional area of channel of 4.91 cm$^2$), and the adsorbent is fixed by the springs having a spring load of 0.5 kg/cm$^2$ and a spring constant of 1.5 kg/cm with punching baffles formed with perforations of 0.8 mm in diameter at 50% of void ratio between them.

As a result of operating the system by intentionally applying one gram of water within a refrigeration cycle, in the case of heating operation, the water in the refrigeration cycle was mostly adsorbed by the dryer in about 4 hours. Similarly, in the case of cooling operation, the water in the refrigeration cycle was mostly adsorbed by the dryer in about 14 hours.

A reliability test was conducted by changing over between cooling and heating operations every 5 minutes, and operating the system for 5000 hours at a specified frequency. As a result, the adsorbent in the dryer was changed to a powder form. The powdering ratio of the adsorbent was 0.8 wt %.

It was found from Embodiments 1 to 5 and Comparative Examples 1 to 4 that a preferable spring load is in a range of about 0.5 kg/cm$^2$ to about 3 kg/cm$^2$. If the spring load is lower than about 0.5 kg/cm$^2$, the adsorbent cannot be sufficiently held against a flow rate of refrigerant and vibration of the system, and the adsorbent is, therefore, more easily changed to a powder form. If the spring load is higher than 3 kg/cm$^2$, the adsorbent provided is more easily changed to a powder form by abrasion. The adsorbent tends to be reduced in crushing resistance as an amount of adsorbed water is increased. In determination from the water content (0.5 to 1 g in overall amount) inside the refrigeration cycle, considering general conditions of installation, it is preferable that the spring load is at 3 kg/cm$^2$ or less. It is also preferable that the spring constant is at about 0.3 kg/cm to about 1 kg/cm. It was found that a significantly high spring constant is not preferable, even when the spring load is unchanged, because the surplus is overcome by an excessive vibration, if the spring constant is significantly high. In the case the spring constant is low, the spring is compressed more in relation to its natural length. Thus, when the spring is provided in either side of the adsorbent, it comes to be difficult that the adsorbent located in the middle of the pressure resistant container is subjected to a given spring load. In the case the spring load is set in an optimum condition, effects due to difference in spring constant were hardly observed.

Exemplary Embodiment 6

An air conditioner shown in FIG. 1 and FIG. 2 is used. In the embodiment, a relation between a cooling capacity of the air conditioner and a sectional area of channel in a pressure resistant container was studied. In the embodiment, an HFC410A refrigerant for a cooling capacity of 2.5 kW class and an ester oil are employed. An adsorbent of 28 g having a diameter of 1.7 to 2.4 mm is placed in a pressure resistant container of an inner diameter of 2.0 cm (a sectional area of channel of 3.14 cm$^2$). The adsorbent is fixed by springs having a spring load of 1 kg/cm$^2$ and a spring constant of 0.5 kg/cm with punching baffles formed with perforations of 0.8 mm in diameter at 50% of void ratio between them.

The system was operated by intentionally applying one gram of water within the refrigeration cycle. As a result, in the case of heating operation, the water within the refrigeration cycle was adsorbed by the dryer in about 4 hours. Similarly, in the case of cooling operation, the water in the refrigeration cycle was adsorbed by the dryer in about 14 hours.

A reliability test was conducted by changing over between cooling and heating operations every 5 minutes, and operating the system for 5000 hours at a specified frequency. As a result, the adsorbent in the dryer was maintained in size of its original shape without being changed to powder.

Comparative Example 5

In Embodiment 6, an air conditioner having a large cooling capacity is produced. In this comparative example, an HFC410A refrigerant for a cooling capacity of 4.0 kW class and an ester oil are used. An adsorbent of 28 g having a diameter of 1.7 to 2.4 mm is placed in a pressure resistant container of an inner diameter of 2.0 cm (a sectional area of channel of 3.14 cm$^2$). The adsorbent is fixed by springs having a spring load of 1 kg/cm$^2$ and a spring constant of 0.5 kg/cm with punching baffles formed with perforations of 0.8 mm in diameter at 50% of void ratio between them.

As a result of operating the system by intentionally applying one gram of water within the refrigeration cycle, in the case of heating operation, the water within the refrigeration cycle was adsorbed by the dryer in about 3 hours. Similarly, in the case of cooling operation, the water in the refrigeration cycle was adsorbed by the dryer in about 12 hours.

A reliability test was conducted by changing over between cooling and heating operations every 5 minutes, and operating the system for 5000 hours generally at a specified frequency. As a result, the adsorbent in the dryer was slightly changed in shape to powder. The powdering ratio was 0.8 wt %. In the case the sectional area of channel is small in relation to a high capacity of an air conditioner, the spring load is overcome by a high flow rate of the refrigerant, and the adsorbent is, therefore, vibrated inside the dryer, and tends to deteriorate to powder. Thus, it is preferable that a relation of B/A 400 g/min cm$^2$ is established, where "A" is a sectional area of channel, and "B" is a circulation rate of refrigerant.

Exemplary Embodiment 7

In the embodiment, an HFC410A refrigerant for a cooling capacity of 2.5 kW class and an ester oil are used. An adsorbent of 28 g having a diameter of 1.7 to 2.4 mm is placed in a pressure resistant container of an inner diameter of 3.0 cm (a sectional area of channel of 7.07 cm$^2$). The adsorbent is fixed by springs having a spring load of 1 kg/cm$^2$ and a spring constant of 0.5 kg/cm with punching baffles formed with perforations of 0.8 mm in diameter at 50% of void ratio between them.

The system was operated by intentionally applying one gram of water within the refrigeration cycle. As a result, in the case of heating operation, the water within the refrigeration cycle was adsorbed by the dryer in about 10 hours. Similarly, in the case of cooling operation, the water in the refrigeration cycle was adsorbed by the dryer in about 36 hours.

A reliability test was conducted by changing over between cooling and heating operations every 5 minutes, and operating the system for 5000 hours generally at a specified frequency. As a result, the adsorbent in the dryer was maintained in size of its original shape without being changed to powder.

Exemplary Embodiment 8

In the embodiment, an HFC410A refrigerant for a cooling capacity of 2.5 kW class and an ester oil are used. An adsorbent of 28 g having a diameter of 1.7 to 2.4 mm is placed in a pressure resistant container of an inner diameter of 3.5 cm (a sectional area of channel of 9.62 cm$^2$). The adsorbent is fixed by springs having a spring load of 1 kg/cm$^2$ and a spring constant of 0.5 kg/cm with punching baffles formed with perforations of 0.8 mm in diameter at 50% of void ratio between them.

As a result of operating the system by intentionally applying one gram of water within the refrigeration cycle, in the case of heating operation, the water within the refrigeration cycle was adsorbed by the dryer in about 24 hours. Similarly, in the case of cooling operation, the water in the refrigeration cycle was adsorbed by the dryer in about 80 hours.

A reliability test was conducted by changing over between cooling and heating operations every 5 minutes, and operating the system for 5000 hours at a specified frequency. As a result, the adsorbent in the dryer was maintained in size of its original shape without being changed to powder.

Comparative Example 6

In the comparative example, an HFC410A refrigerant for a cooling capacity of 2.5 kW class and an ester oil are used. An adsorbent of 28 g having a diameter of 1.7 to 2.4 mm is placed in a pressure resistant container of an inner diameter of 4.0 cm (a sectional area of channel of 12.56 cm$^2$). The adsorbent is fixed by springs having a spring load of 1 kg/cm$^2$ and a spring constant of 0.5 kg/cm with punching baffles formed with perforations of 0.8 mm in diameter at 50% of void ratio between them.

As a result of operating the system by intentionally applying one gram of water within the refrigeration cycle, in the case of heating operation, the water within the refrigeration cycle was adsorbed by the dryer in about 40 hours. Similarly, in the case of cooling operation, the water in the refrigeration cycle was adsorbed by the dryer in about 160 hours.

A reliability test was conducted by changing over between cooling and heating operations every 5 minutes, and operating the system for 5000 hours at a specified frequency. As a result, the adsorbent in the dryer was maintained in size of its original shape without being changed to powder.

If a sectional area "A" of channel is excessive in relation to a circulation rate "B" of refrigerant, a rate of removing water in a refrigeration cycle is significantly reduced. In the case of using an ester oil, it is required to remove water at a high rate in order to prevent deterioration of the oil. It is preferable that a relation of 100 g/min cm$^2$ B/A is established between the sectional area "A" of channel and circulation rate "B" of refrigerant.

Comparative Example 7

In the comparative example, an HFC410A refrigerant for a cooling capacity of 2.5 kW class and an ester oil are used. An adsorbent of 28 g having a diameter of 1.7 to 2.4 mm is placed in a pressure resistant container of an inner diameter of 2.5 cm (a sectional area of channel of 4.91 cm$^2$). The adsorbent is fixed by springs having a spring load of 1 kg/cm² and a spring constant of 0.5 kg/cm with punching baffles formed with perforations of 1.0 mm in diameter at 50% of void ratio between them.

As a result of operating the system by intentionally applying one gram of water within the refrigeration cycle, in the case of heating operation, the water within the refrigeration cycle was adsorbed by the dryer in about 5 hours. Similarly, in the case of cooling operation, the water in the refrigeration cycle was adsorbed by the dryer in about 16 hours.

A reliability test was conducted by changing over between cooling and heating operations every 5 minutes, and operating the system for 5000 hours almost at a specified frequency. As a result, the adsorbent in the dryer was slightly changed to powder. The powdering ratio was about 0.3 wt %.

Comparative Example 8

In the comparative example, an HFC410A refrigerant for a cooling capacity of 2.5 kW class and an ester oil are used. An adsorbent of 28 g having a diameter of 1.7 to 2.4 mm is placed in a pressure resistant container of an inner diameter of 2.5 cm (a sectional area of channel of 4.91 cm²). The adsorbent is fixed by springs having a spring load of 3 kg/cm² and a spring constant of 1 kg/cm with punching baffles formed with perforations of 1.0 mm in diameter at 50% of void ratio between them.

As a result of operating the system by intentionally applying a gram of water within the refrigeration cycle, in the case of heating operation, the water within the refrigeration cycle was adsorbed by the dryer in about 5 hours. Similarly, in the case of cooling operation, the water in the refrigeration cycle was adsorbed by the dryer in about 16 hours.

A reliability test was conducted by changing over between cooling and heating operations every 5 minutes, and operating the system for 5000 hours at a specified frequency. As a result, the adsorbent in the dryer was slightly changed to powder. The powdering ratio was about 0.8 wt %.

Comparative Example 9

In the comparative example, an HFC410A refrigerant for a cooling capacity of 2.5 kW class and an ester oil are used. An adsorbent of 28 g having a diameter of 1.7 to 2.4 mm is placed in a pressure resistant container of an inner diameter of 2.5 cm (a sectional area of channel of 4.91 cm²). The adsorbent is fixed by springs having a spring load of 3 kg/cm² and a spring constant of 1 kg/cm with punching baffles formed with perforations of 1.2 mm in diameter at 50% of void ratio between them.

As a result of operating the system by intentionally applying one gram of water within the refrigeration cycle, in the case of heating operation, the water within the refrigeration cycle was adsorbed by the dryer in about 5 hours. Similarly, in the case of cooling operation, the water in the refrigeration cycle was adsorbed by the dryer in about 16 hours.

A reliability test was conducted by changing over between cooling and heating operations every 5 minutes, and operating the system for 5000 hours at a specified frequency. As a result, the adsorbent in the dryer was slightly changed to powder. The powdering ratio was about 1.8 wt %.

In a relation between a perforation size "C" in the punching baffles and a diameter "D" of adsorbent provided, it was found from Embodiment 3 and Comparative Examples 8 and 9 that the value of D/C is desirably at 2 or more. In other words, if the diameter "D" of adsorbent is smaller in relation to the perforation size "C", the adsorbent enters into the perforations in the baffles, when the adsorbent is moved by vibration or the like, which promotes powdering of the adsorbent. In the case the value of D/C is higher, although no specific inconvenience is caused, if the perforation size in the punching baffles is too small, a punching operation itself comes to be difficult in production. If the diameter of adsorbent is significantly large, a sufficient breaking strength cannot be obtained because a binder in the adsorbent is unevenly burnt. Thus, it is desirable that a relation of $2 \leq D/C \leq 20$ is established.

Exemplary Embodiment 9

An adsorbent (prepared by Union Showa; XH-10C) containing about 75 wt % of A-type zeolite and a balance of a clay binder was subjected to a thermal stability test at 120°0 C. for 28 days in a pressure resistant container in the presence of HFC410A and an ester oil. As a result, the adsorbent showed a crystallization rate of 100%. By using an HFC32 refrigerant, the adsorbent (prepared by Union Showa; XH-10C) used in the embodiment was measured for a capacity of adsorbing HFC 32 gas at a pressure of 500 mmHg for 3 hours. As a result, the capacity of adsorbing HFC gas was 0.8%.

Comparative Example 10

An adsorbent (prepared by Union Showa; XH-9) containing about 75 wt % of A-type zeolite and a balance of a clay binder was subjected to a thermal stability test at 120° C. for 28 days in a pressure resistant container in the presence of HFC410A and an ester oil. As a result, the adsorbent showed a crystallization rate of about 80%. By using an HFC32 refrigerant, the adsorbent (prepared by Union Showa; XH-9) used in the embodiment was measured for a capacity of adsorbing HFC 32 gas at a pressure of 500 mmHg for 3 hours. As a result, the capacity of adsorbing HFC gas was 2.2%.

From Embodiment 9 and Comparative Example 10, it was found that a reliability of adsorbent in a condition of a high temperature and a high pressure is predictable by measuring a property of adsorbing HFC32 gas. In the case the crystallization rate is reduced in a thermal stability test, HFC32 is trapped by the adsorbent correspondingly to the ratio of reduction thereof, and deterioration of the refrigerant and oil is thereby promoted. If any reduction of oil is caused, in the case the oil used is an ester oil, the ester oil is acceleratingly reduced in quality. Therefore, it is specifically required to give sufficient consideration in the case of a refrigeration cycle using an ester oil.

A synthetic zeolite of A type and a clay for use as a binder are mixed, then granulated, and the granules obtained are burnt at a predetermined temperature. In such manner, an adsorbent providing a breaking strength according to properties required can be obtained. In such operation, in the case the content of a clay component is low, a higher temperature is required for the burning process, and a water absorbing property of the synthetic zeolite is reduced as a result. Thus, it is desirable that an adsorbent is obtained by burning granules containing a clay component of 15 to 30 wt % and a synthetic zeolite at 500 to 700° C.

In the embodiments described, although an ester oil preferable as a refrigerating machine oil for use with HFC410A is employed, the invention is not limited thereto, and a dryer according to the invention provides a good result similarly to the embodiments, even when an ether oil higher in moisture absorption is used.

Further, in the embodiments, although a dryer described is provided with springs in both sides of a adsorbent, the invention is not limited thereto, and is also applicable to a dryer that is provided with a spring in a side of an adsorbent. A dryer with springs in both sides of an adsorbent is more capable of coping with various operating conditions. In such case, more careful consideration is required for designing a dryer (selecting a spring load and a spring constant).

As shown in the embodiments, a long-term reliability of a dryer is achieved by optimizing a spring load of a spring for fixing an adsorbent.

In addition, by specifying a spring constant of the spring, as an appropriate surplus is maintained in the spring, a long-term reliability against an excessive flow rate and vibration of an HFC410 refrigerant is also obtained. By specifying a relation between a sectional area of channel and a circulation rate of refrigerant in a heat resistant container, water in the cycle can be efficiently adsorbed, and no significant pressure loss is caused. Further, by specifying the ratio between a perforation size in punching baffles for firmly holding an adsorbent and a diameter of the adsorbent, the adsorbent is prevented from entering into the perforations in the punching baffles, and a long-term reliability of dryer can be obtained. Also, by controlling such simple physical properties as a rate of change in crystallization rate of an adsorbent, a long-term reliability of the adsorbent in a refrigeration cycle can be predicted.

We claim:

1. An air conditioner, comprising:
    a compressor,
    a heat exchanger,
    a throttling device,
    a dryer having a container in which is located an adsorbent having a plurality of bulk particles, and,
    a refrigerant,
    said dryer further includes pressing means having a load of about 0.5 kg/cm$^2$ to about 3 kg/cm$^2$ for holding said adsorbent, and
    wherein the adsorbent adsorbs water contained in the refrigerant.

2. An air conditioner of claim 1, wherein said refrigerant includes at least one of difluoromethane and pentafluoroethane.

3. An air conditioner of claim 1, wherein said pressing means includes a spring.

4. An air conditioner of claim 1, wherein said pressing means includes a spring having a spring constant within a range of about 0.3 kg/cm to about 1 kg/cm.

5. An air conditioner of claim 1, wherein each one of the plurality of bulk particles is generally of a spherical shape having a diameter within a range of about 0.5 mm to about 5 mm.

6. An air conditioner, comprising:
    a compressor,
    a heat exchanger,
    a throttling device,
    a dryer having a container which is located an adsorbent having a plurality of bulk particles, and;
    a refrigerant,
    said dryer further includes pressing means for holding said adsorbent,
    said container is of a cylindrical shape having a sectional area of "A",
    said refrigerant is at a circulation rate of "B",
    the value of B/A is a range of about 100 g/min cm$^2$ to about 400 g/min cm$^2$, and
    wherein the adsorbent adsorbs water contained in the refrigerant.

7. An air conditioner of claim 6, wherein said refrigerant includes at least one of difluoromethane and pentafluoroethane.

8. An air conditioner of claim 6, wherein said pressing means has a load of about 0.5 kg/cm$^2$ to about 3 kg/cm$^2$.

9. An air conditioner, comprising:
    a compressor,
    a heat exchanger,
    a throttling device,
    a dryer having a container in which is located an adsorbent having a plurality of bulk particles, and;
    a refrigerant,
    said dryer further includes pressing means having a load for holding the adsorbent,
    said pressing means has a punching baffle formed with a plurality of through-holes,
    each one of the plurality of bulk particles has a mean diameter of "D",
    each one of the plurality of through-holes has a diameter of "C",
    the value of D/C is at least about 2, and
    the adsorbent adsorbs water contained in the refrigerant.

10. An air conditioner of claim 9, wherein said refrigerant includes at least one of difluoromethane and pentafluoroethane.

11. An air conditioner of claim 9, wherein the load of the pressing means is from about 0.5 kg/cm$^2$ to about 3 kg/cm$^2$.

12. An air conditioner, comprising:
    a compressor,
    a heat exchanger,
    a throttling device,
    a dryer provided having a container in which is located an adsorbent having a plurality of bulk particles and,
    a refrigerant including,
    a hydrofluorocarbon refrigerant comprising difluoromethane and pentafluoroethane,
    said dryer further includes pressing means for holding the adsorbent,
    said pressing means having a punching baffle formed with a plurality of through-holes,
    said adsorbent includes a synthetic zeolite,
    the capacity of the synthetic zeolite in adsorbing the difluoromethane in a condition of 25° C. and a pressure of the difluoromethane of 500 mmHg is at about 1.0% or less,
    wherein the adsorbent adsorbs water contained in the refrigerant.

13. An air conditioner of claim 1, wherein said refrigerant is a hydrofluorocarbon refrigerant.

14. An air conditioner of claim 6, wherein said refrigerant is a hydrofluorocarbon refrigerant.

15. An air conditioner of claim 9, wherein said refrigerant is a hydrofluorocarbon refrigerant.

* * * * *